(12) United States Patent
Roohr

(10) Patent No.: US 8,305,705 B1
(45) Date of Patent: Nov. 6, 2012

(54) DISK DRIVE CROSS CORRELATING TRACK CROSSING SIGNAL WITH IDEAL SIGNAL TO CALIBRATE JOG VALUE

(75) Inventor: Lawrence E. Roohr, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 364 days.

(21) Appl. No.: 12/774,570

(22) Filed: May 5, 2010

(51) Int. Cl.
*G11B 5/596* (2006.01)
(52) U.S. Cl. ................................. 360/77.04
(58) Field of Classification Search .............. None
See application file for complete search history.

(56) References Cited

U.S. PATENT DOCUMENTS

| | | | |
|---|---|---|---|
| 4,414,589 A | 11/1983 | Oliver et al. | |
| 5,500,776 A | 3/1996 | Smith | |
| 5,576,906 A * | 11/1996 | Fisher et al. | 360/77.08 |
| 5,691,857 A * | 11/1997 | Fitzpatrick et al. | 360/77.04 |
| 5,926,337 A | 7/1999 | Itou et al. | |
| 5,949,602 A | 9/1999 | Ishioka et al. | |
| 6,008,962 A | 12/1999 | Le et al. | |
| 6,025,969 A | 2/2000 | Ishioka et al. | |
| 6,061,201 A | 5/2000 | Woods | |
| 6,317,285 B1 | 11/2001 | Bi et al. | |
| 6,421,197 B1 | 7/2002 | Abdelnour | |
| 6,476,992 B1 | 11/2002 | Shimatani | |
| 6,510,015 B2 | 1/2003 | Sacks et al. | |
| 6,510,017 B1 | 1/2003 | Abdelnour | |
| 6,590,388 B2 * | 7/2003 | Arnaout et al. | 324/210 |
| 6,631,046 B2 | 10/2003 | Szita et al. | |
| 6,650,491 B2 | 11/2003 | Suzuki et al. | |
| 6,657,810 B1 | 12/2003 | Kupferman | |
| 6,680,609 B1 * | 1/2004 | Fang et al. | 324/210 |
| 6,687,078 B1 | 2/2004 | Kim | |
| 6,751,035 B1 | 6/2004 | Belser | |
| 6,751,042 B2 | 6/2004 | Bi et al. | |
| 6,754,030 B2 | 6/2004 | Seng et al. | |
| 6,765,744 B2 | 7/2004 | Gomez et al. | |
| 6,947,248 B2 | 9/2005 | Allen et al. | |
| 7,006,322 B2 | 2/2006 | Sado | |
| 7,019,924 B2 | 3/2006 | McNeil et al. | |
| 7,019,939 B2 | 3/2006 | Kusumoto et al. | |
| 7,064,914 B1 * | 6/2006 | Erden et al. | 360/31 |
| 7,106,547 B1 * | 9/2006 | Hargarten et al. | 360/77.04 |
| 7,133,237 B2 | 11/2006 | Ikeda et al. | |
| 7,193,809 B1 | 3/2007 | Allen | |
| 7,215,514 B1 | 5/2007 | Yang et al. | |
| 7,265,930 B2 | 9/2007 | Nakamura et al. | |
| 7,271,977 B1 | 9/2007 | Melrose et al. | |
| 7,286,313 B2 * | 10/2007 | Erden et al. | 360/46 |
| 7,352,526 B2 | 4/2008 | Takaishi | |

(Continued)

OTHER PUBLICATIONS

U.S. Appl. No. 12/343,285, filed Dec. 23, 2008, 24 pages.

*Primary Examiner* — Hoa T Nguyen
*Assistant Examiner* — James L Habermehl

(57) ABSTRACT

A disk drive is disclosed comprising a disk including a plurality of tracks, and a head actuated over the disk, wherein the head comprises a read element radial offset from a write element. A jog value corresponding to the radial offset is calibrated by writing data to a plurality of tracks, reading the plurality of written tracks to generate an actual track crossing signal, cross correlating the actual track crossing signal with an ideal track crossing signal to generate a cross correlation signal, and calibrating the jog value in response to the cross correlation signal.

16 Claims, 6 Drawing Sheets

U.S. PATENT DOCUMENTS

| | | |
|---|---|---|
| 7,388,729 B2 | 6/2008 | Nakamura |
| 7,394,612 B2 | 7/2008 | Ahn et al. |
| 7,440,222 B2 | 10/2008 | Nakamura et al. |
| 7,502,193 B2 * | 3/2009 | Albrecht et al. ............ 360/75 |
| 7,561,370 B2 | 7/2009 | Melrose et al. |
| 7,706,100 B2 | 4/2010 | Kawabe |
| 7,800,859 B2 | 9/2010 | Moriya et al. |
| 7,961,422 B1 * | 6/2011 | Chen et al. ............ 360/77.04 |
| 8,116,025 B1 * | 2/2012 | Chan et al. ............ 360/77.06 |
| 8,174,781 B2 * | 5/2012 | Heeren et al. ............ 360/31 |
| 2005/0264917 A1 | 12/2005 | Yano et al. |
| 2008/0002280 A1 | 1/2008 | Asakura |

* cited by examiner

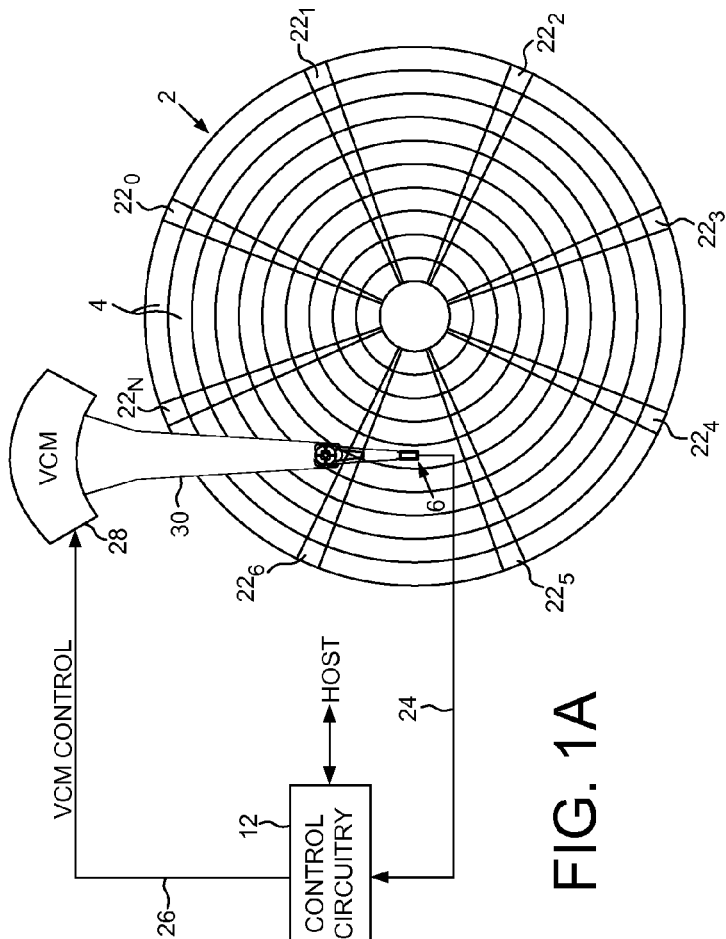
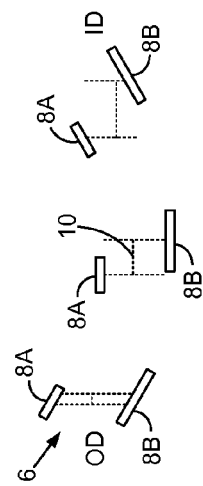
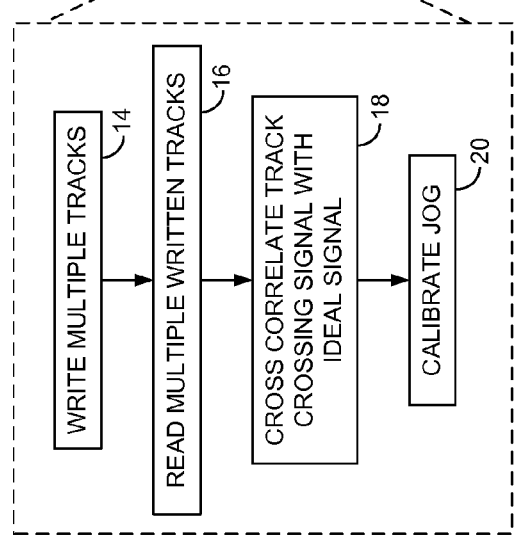

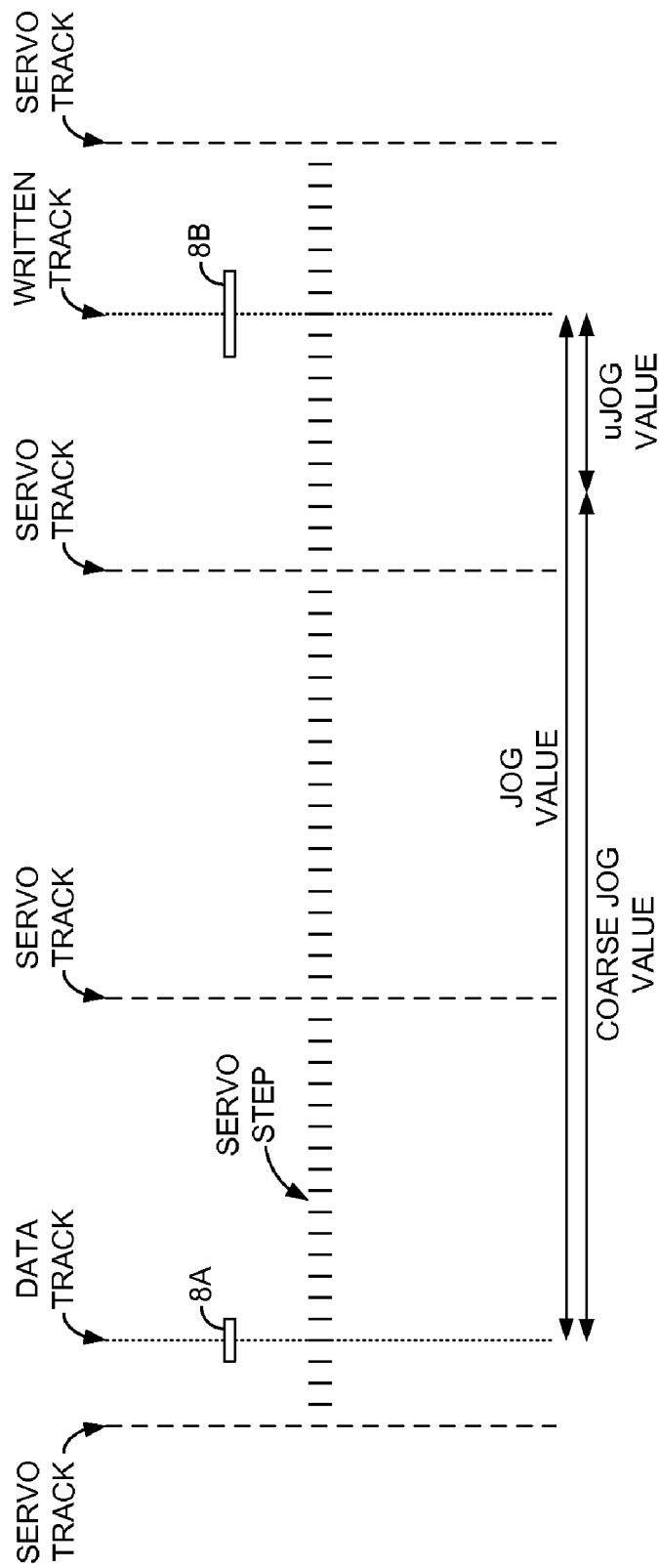

DISK DRIVE CROSS CORRELATING TRACK CROSSING SIGNAL WITH IDEAL SIGNAL TO CALIBRATE JOG VALUE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Certain types of heads (e.g., magnetoresistive heads) comprise a read element radial offset from a write element. The radial offset may span a fraction of a track, or several tracks plus a fraction of a track. To account for this radial offset, a jog value is typically added to the servo system either during write or read operations. There is, therefore, a need to calibrate the jog value by estimating the radial offset between the read element and write element.

BRIEF DESCRIPTION OF THE DRAWINGS

FIG. 1A shows a disk drive according to an embodiment of the present invention comprising a head actuated over a disk.

FIG. 1B shows an embodiment of the present invention wherein the head comprises a read element radially offset from a write element.

FIG. 1C is a flow diagram according to an embodiment of the present invention for calibrating a jog value corresponding to the radially offset by cross correlating an actual track crossing signal with an ideal track crossing signal.

FIG. 1D shows a plurality of servo tracks separated by a number of servo steps wherein data tracks are defined relative to the servo steps.

DETAILED DESCRIPTION OF EMBODIMENTS OF THE INVENTION

Figure 2A:
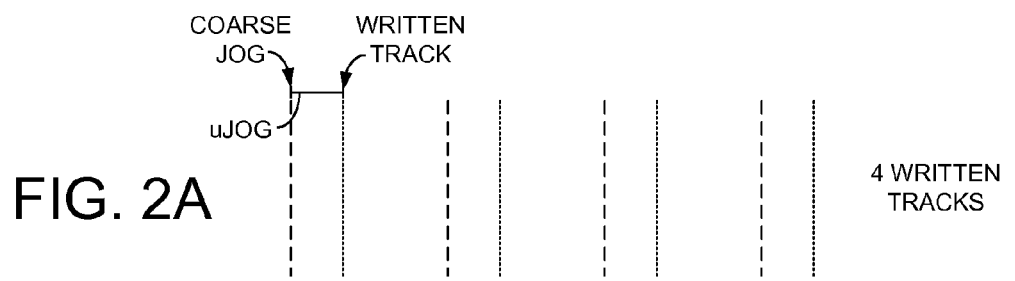
FIG. 2A shows an embodiment of the present invention illustrating a micro-jog value for a plurality of written tracks.

FIG. 1A shows a disk drive according to an embodiment of the present invention comprising a disk 2 including a plurality of tracks 4, and a head 6 actuated over the disk 2, wherein the head 6 comprises a read element 8A radial offset 10 from a write element 8B (FIG. 1B). The disk drive further comprises control circuitry 12 operable to execute the flow diagram of FIG. 1C in order to calibrate a jog value corresponding to the radial offset 10. Data is written to a plurality of tracks (step 14), and the plurality of written tracks are read to generate an actual track crossing signal (step 16). The actual track crossing signal is cross correlated with an ideal track crossing signal to generate a cross correlation signal (step 18), and the jog value is calibrated in response to the cross correlation signal (step 20).

In the disk drive of FIG. 1A, a plurality of embedded servo sectors $22_0$-$22_N$ are recorded on the disk to define the plurality of tracks 4, wherein each servo sector comprises suitable position information, such as a track address providing coarse position information and servo bursts providing fine position information. As the head passes over a servo sector, the control circuitry 12 demodulates a read signal 24 emanating from the head into a position error signal (PES). The PES is filtered by a suitable compensation filter to generate a control signal 26 applied to a voice coil motor (VCM) 28. The VCM 28 rotates an actuator arm 30 about a pivot in order to position the head 6 radially over the disk in a direction that reduces the PES.

FIG. 1D illustrates a jog value that is calibrated to account for the radial offset between the read element 8A and the write element 8B (FIG. 1B). In this embodiment, during write operations the read element 8A is servoed over a target servo step of a target servo track that corresponds to a target data track, and then data is written at whatever radial location the write element 8B lands. To read the written data track, the read element 8A is positioned over a radial location equal to the original radial location during the write operation plus the jog value as illustrated in FIG. 1D. In this embodiment, the written data will align at various different fractional locations between the servo tracks as the reader/writer radial offset changes with the skew angle of the head (FIG. 1B). In an alternative embodiment, a jog value may be introduced into the servo system during the write operations so that the written data is always substantially aligned at the same radial location with respect to the servo tracks (e.g., aligned with the center of the servo tracks).

Referring again to FIG. 1D, in one embodiment a coarse jog value is calibrated, and then a micro-jog value is calibrated using a cross correlation technique described herein. The final jog value is generated by adding the coarse jog value and the micro-jog value. The coarse jog value may be calibrated in any suitable manner, wherein in one embodiment, the coarse jog value is generated by first erasing a band of tracks, and then writing a single track at some point within the erased band. The read element 8A is then swept over the erased band of tracks (starting with the original radial location of the read element when the track was written) to locate the written track, for example, at the radial location where the read signal is maximum. The coarse jog value may then be selected by subtracting an offset from the detected radial offset to ensure the coarse jog value is less then the final jog value.

FIG. 2A illustrates an embodiment of the present invention wherein while servoing the read element 8A of the head 6 over a data track, data is written at whatever radial location the write element 8B is positioned (FIG. 1D). The process of writing data is repeated for multiple tracks (four tracks in the embodiment of FIG. 2A), wherein the distance between the written tracks may be one or more data tracks. Separating each written track by multiple data tracks may improve the micro-jog calibration by evaluating a wider span of the disk, particularly if there are defects on the disk at any particular radial location.

Figure 2B:
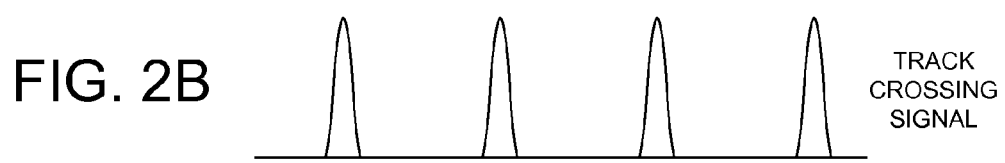
FIG. 2B shows an actual track crossing signal generated by reading a plurality of the written tracks according to an embodiment of the present invention.

After writing the tracks, the read element 8A is positioned over the fraction of a servo track corresponding to the coarse jog value (FIG. 1D) and then moved incrementally over each of the written tracks to generate an actual track crossing signal as illustrated in FIG. 2B (i.e., the actual track crossing signal comprises multiple pulses corresponding to the multiple written tracks). The actual track crossing signal may be generated in any suitable manner, such as by measuring an amplitude of the read signal, or a quality metric of the read signal such as a sequence detector quality metric, or an error correction code quality metric.

Figure 2C:
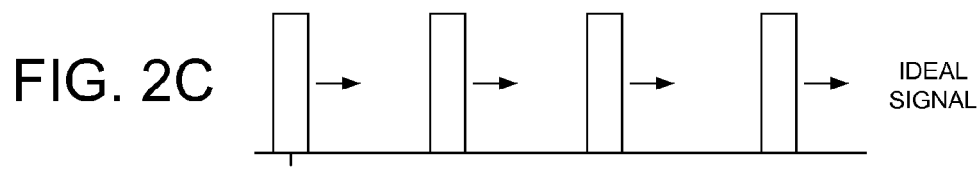
FIG. 2C shows an ideal track crossing signal comprising square wave pulses having a width equal to a fraction of a track according to an embodiment of the present invention.

FIG. 2C illustrates an example ideal track crossing signal comprising a plurality of square wave pulses each having a width substantially equal to a predetermined fraction of the corresponding written track. The pulses in the ideal track crossing signal may comprise any suitable shape (e.g., trapezoidal, triangular, etc.) and may also comprise any suitable width relative to the written track. In the example of FIG. 2C, the ideal track crossing signal comprises four square wave pulses corresponding to the four written tracks of FIG. 2A.

Figure 2D:
FIG. 2D shows a cross correlation signal generated by cross correlating the actual track crossing signal with the ideal track crossing signal according to an embodiment of the present invention.

FIG. 2D illustrates a cross correlation signal generated by shifting the ideal track crossing signal by a phase offset (starting at zero phase offset relative to the coarse jog value shown in FIG. 1D), and then computing a cross correlation. This processes of shifting the ideal track crossing signal by a phase offset continues for multiple phase offsets, and a cross correlation computed at each phase offset similar to computing a convolution. The resulting cross correlation signal shown in FIG. 2D comprises a peak corresponding to the phase offset where the cross correlation is maximum which corresponds to the calibrated micro-jog value regardless as to the shape (and quality) of the pulses in the actual track crossing signal.

Cross correlating an ideal track crossing signal with an actual track crossing signal for multiple tracks may improve the calibrated jog value compared to evaluating the shape of each track crossing pulse (e.g., peak and shoulder) and averaging the result for multiple tracks as is typically done in the prior art. That is, a cross correlation measures the area under the curve of the actual track crossing pulses which is substantially less sensitive to the shape of the pulses. In addition, evaluating multiple written tracks simultaneously by computing a cross correlation effectively averages out defects and other noise (e.g., track squeeze, servo writing errors, etc.) that might occur for any particular track.

Figure 3A:
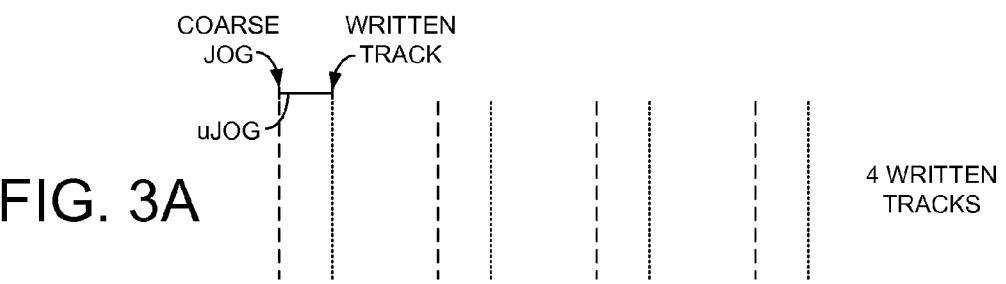
FIGS. 3A-3D show an embodiment of the present invention wherein the actual track crossing signal as well as the cross correlation signal are inverted.
Figure 3B:
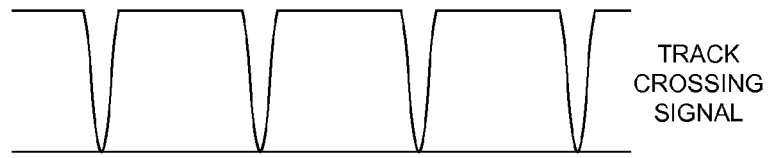
Figure 3C:
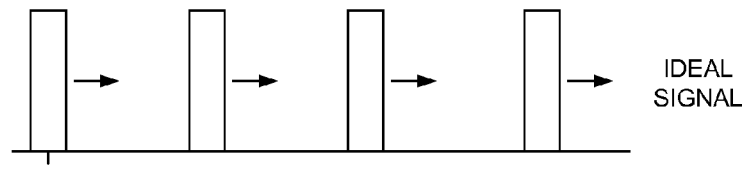
Figure 3D:

The cross correlation between the actual track crossing signal and the ideal track crossing signal may be generated in any suitable manner. In an embodiment illustrated in FIGS. 3A-3D, the actual track crossing signal may reach a minimum as the read element 8A is aligned over the center of the written track as illustrated in FIG. 3B. For example, the actual track crossing signal may be generated as a mean squared error between actual read signal samples and target read signal samples of a target response (e.g., a target partial response). The mean squared error reaches a minimum when the read element 8A is aligned over the center of a written track. The resulting cross correlation signal shown in FIG. 3D is inverted compared to FIG. 2D wherein the micro-jog value is calibrated relative to a minimum of the cross correlation signal.

Figure 4:
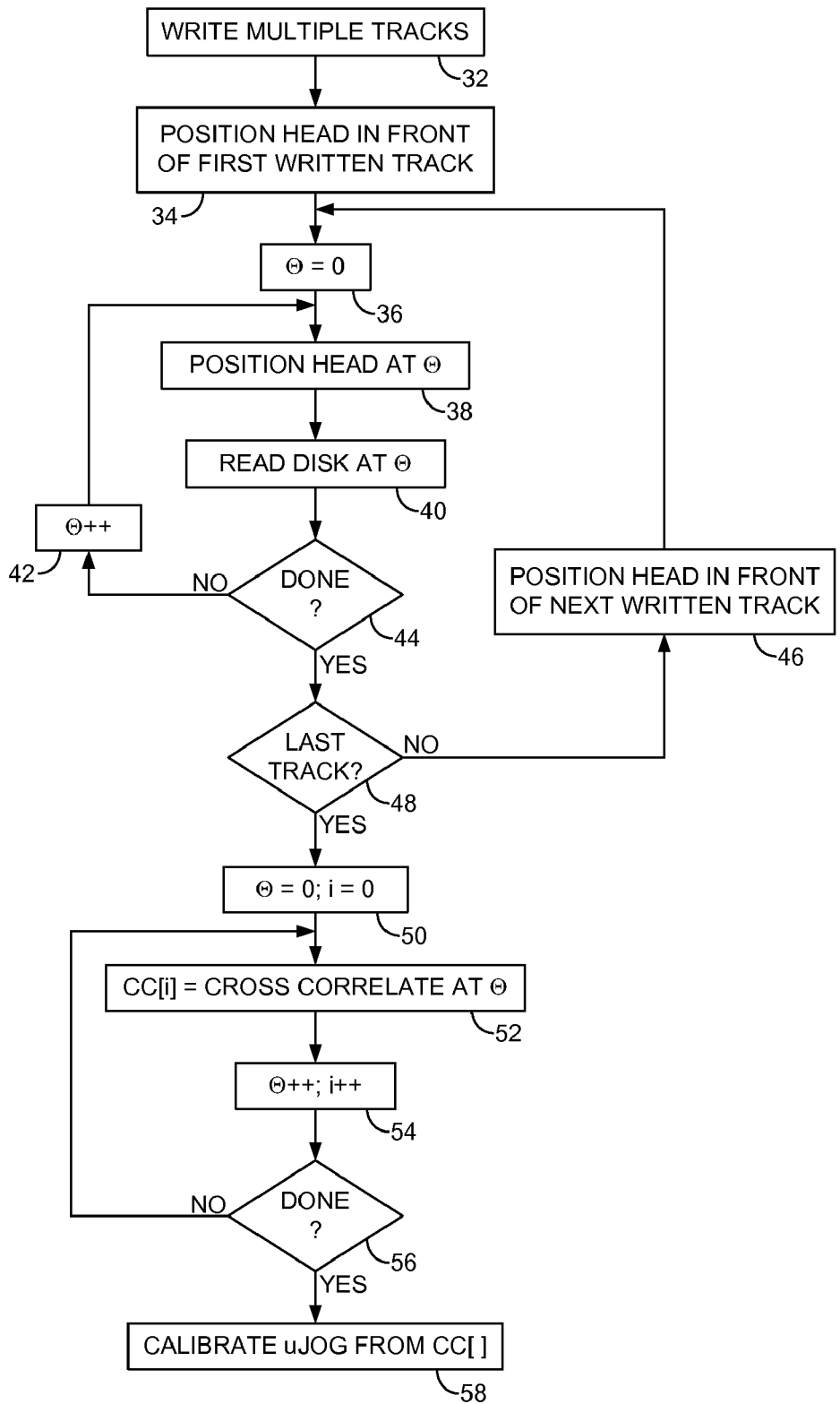
FIG. 4 is a flow diagram according to an embodiment of the present invention wherein a cross correlation signal is generated at discrete points by introducing multiple phase offsets between the actual track crossing signal and the ideal track crossing signal.

FIG. 4 is a flow diagram according to an embodiment of the present invention wherein after writing multiple tracks (step 32) and calibrating a coarse jog value as described above, the read element 8A of the head is positioned in front of the first written track (step 34) and a phase offset is initialized to zero (step 36). The read element 8A of the head is then positioned at the phase offset (step 38) and the read signal saved (step 40). The phase offset is then incremented (step 42) and the process is repeated until an actual track crossing signal has been generated for the first written track (step 44). The read element 8A of the head is then positioned in front of the next written track (step 46) and the process repeated starting with step 36 until an actual track crossing signal has been generated for all of the written tracks (step 48).

A phase offset and an index are then initialized to zero (step 50) and a cross correlation value generated by cross correlating the actual track crossing signal with the ideal track crossing signal at the phase offset (step 52). The phase offset and index are then incremented (step 54) and another cross correlation value generated at the phase offset. This processes is repeated until a peak (or valley) has been generated in the cross correlation signal (step 56). A micro-jog value is then calibrated in response to the cross correlation signal (step 58).

Figure 5:
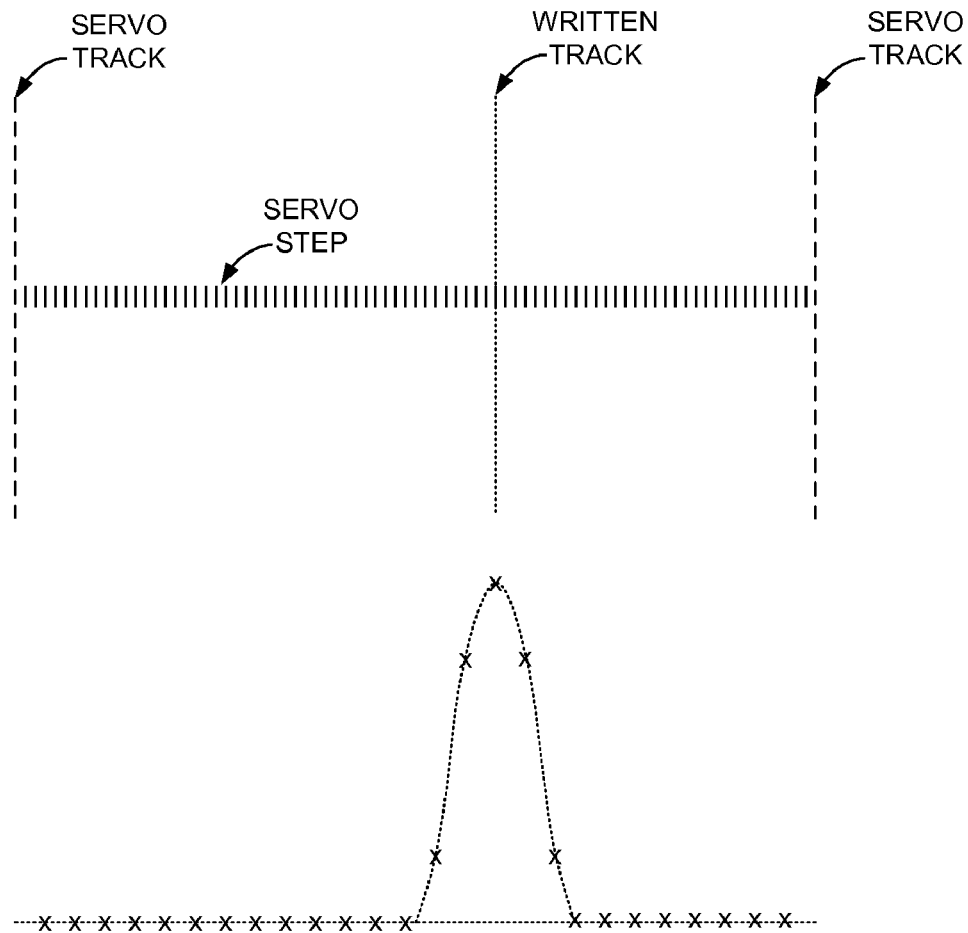
FIG. 5 shows an embodiment of the present invention wherein the read element is swept over the written tracks at a coarse resolution and then interpolated to generate the actual track crossing signal cross correlated with the ideal track crossing signal.

FIG. 5 shows an embodiment of the present invention wherein when calibrating the jog value the written tracks are sampled at a resolution that is less than the servo step. In the example of FIG. 5, the written track is sampled at every third servo step such that the phase is incremented by three servo steps at step 42 of FIG. 4. The actual track crossing signal is then generated at the higher resolution of the servo step by interpolating the written track samples. In one embodiment, the cross correlation between the actual track crossing signal with the ideal track crossing signal is generated at the resolution of the servo step. That is, the phase is incremented by one servo step at step 54 of FIG. 4 such that the ideal track crossing signal is shifted by one servo step when generating each cross correlation value. This embodiment helps expedite calibrating the micro-jog value by reducing the time needed to read the written tracks while still providing sufficient accuracy in the micro-jog estimate.

Referring again to FIG. 1B, the radial offset 10 between the read element 8A and the write element 8B may vary based on the radial location of the head 6 due to a skew angle of the head 6. Therefore, in one embodiment a coarse jog value and micro-jog value are calibrated using the above described cross correlation technique at multiple radial locations. Any suitable resolution may be employed to calibrate different jog values at different radial locations, for example, a jog value may be calibrated for every N number of tracks across the disk surface.

In the embodiment of FIG. 1D, when writing a track during the jog calibration the read element 8A is positioned at a target radial location that defines a data track relative to the servo tracks. However, the read element 8A may be positioned at any suitable target radial location relative to the servo tracks when writing the tracks used to calibrate the jog value. For example, in one embodiment the read element 8A may be positioned over the center of a servo track when writing the tracks used to calibrate the jog value (coarse jog and micro-jog). The calibrated jog value may then be used to offset the read element 8A during a normal read operation relative to a target data track as described above (or alternatively used to offset the write element 8B during a normal write operation relative to a target data track).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk comprising a plurality of tracks;
a head actuated over the disk, wherein the head comprises a read element radial offset from a write element; and
control circuitry operable to calibrate a jog value corresponding to the radial offset by:
writing data to a plurality of tracks;
reading the plurality of written tracks to generate an actual track crossing signal;
cross correlating the actual track crossing signal with an ideal track crossing signal to generate a cross correlation signal; and
calibrating the jog value in response to the cross correlation signal.

2. The disk drive as recited in claim 1, wherein the control circuitry is operable to generate a data point in the cross correlation signal by introducing a phase offset between the actual track crossing signal and the ideal track crossing signal.

3. The disk drive as recited in claim 2, wherein the control circuitry is operable to generate multiple data points in the cross correlation signal by introducing multiple phase offsets between the actual track crossing signal and the ideal track crossing signal.

4. The disk drive as recited in claim 3, wherein the control circuitry is operable to calibrate the jog value relative to a maximum of the cross correlation signal.

5. The disk drive as recited in claim 3, wherein the control circuitry is operable to calibrate the jog value relative to a minimum of the cross correlation signal.

6. The disk drive as recited in claim 1, wherein the control circuitry is operable to:
generate samples of a first track crossing signal at a first resolution when reading the written tracks; and
interpolate the samples to generate the actual track crossing signal at a second resolution higher than the first resolution.

7. The disk drive as recited in claim 6, wherein the control circuitry is operable to generate the cross correlation signal at the second resolution.

8. The disk drive as recited in claim 1, wherein the control circuitry is operable to calibrate a plurality of jog values each corresponding to a different radial location of the disk.

9. A method of operating a disk drive comprising a head actuated over a disk including a plurality of tracks, wherein the head comprises a read element radial offset from a write element, the method comprising calibrating a jog value corresponding to the radial offset by:
writing data to a plurality of tracks;
reading the plurality of written tracks to generate an actual track crossing signal;
cross correlating the actual track crossing signal with an ideal track crossing signal to generate a cross correlation signal; and
calibrating the jog value in response to the cross correlation signal.

10. The method as recited in claim 9, further comprising generating a data point in the cross correlation signal by introducing a phase offset between the actual track crossing signal and the ideal track crossing signal.

11. The method as recited in claim 10, further comprising generating multiple data points in the cross correlation signal by introducing multiple phase offsets between the actual track crossing signal and the ideal track crossing signal.

12. The method as recited in claim 11, further comprising calibrating the jog value relative to a maximum of the cross correlation signal.

13. The method as recited in claim 11, further comprising calibrating the jog value relative to a minimum of the cross correlation signal.

14. The method as recited in claim 9, further comprising:
generating samples of a first track crossing signal at a first resolution when reading the written tracks; and
interpolating the samples to generate the actual track crossing signal at a second resolution higher than the first resolution.

15. The method as recited in claim 14, further comprising generating the cross correlation signal at the second resolution.

16. The method as recited in claim 9, further comprising calibrating a plurality of jog values each corresponding to a different radial location of the disk.

* * * * *